(12) United States Patent
Tibbott et al.

(10) Patent No.: US 11,085,424 B2
(45) Date of Patent: *Aug. 10, 2021

(54) SOLAR POWER COLLECTION SYSTEM AND METHODS THEREOF

(71) Applicants: Gina Anne Tibbott, Philadelphia, PA (US); Neel Krishnan, Brooklyn, NY (US)

(72) Inventors: Gina Anne Tibbott, Philadelphia, PA (US); Neel Krishnan, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,263

(22) Filed: Jun. 10, 2019

(65) Prior Publication Data

US 2019/0293056 A1 Sep. 26, 2019

Related U.S. Application Data

(63) Continuation of application No. 15/563,364, filed as application No. PCT/US2016/025481 on Apr. 1, 2016, now Pat. No. 10,371,126.

(Continued)

(51) Int. Cl.
| | |
|---|---|
| *F03G 6/06* | (2006.01) |
| *F28D 20/02* | (2006.01) |
| *F24S 23/00* | (2018.01) |
| *F24S 60/10* | (2018.01) |
| *F24S 50/20* | (2018.01) |

(Continued)

(52) U.S. Cl.
CPC .............. *F03G 6/065* (2013.01); *F24S 20/20* (2018.05); *F24S 23/00* (2018.05); *F24S 23/31* (2018.05); *F24S 50/20* (2018.05); *F24S 60/10* (2018.05); *F24S 70/16* (2018.05); *F28D 20/02* (2013.01); *F24S 23/30* (2018.05); *F24S 23/70* (2018.05); *Y02E 10/40* (2013.01); *Y02E 10/44* (2013.01); *Y02E 10/46* (2013.01); *Y02E 60/14* (2013.01); *Y02E 70/30* (2013.01)

(58) Field of Classification Search
CPC . F03G 6/065; F24S 23/00; F24S 60/00; F24S 20/20; F24S 23/31; F24S 70/16; F24S 23/70; F24S 23/30; F28D 20/02; Y02E 70/30; Y02E 60/145; Y02E 10/44; Y02E 10/46; Y02E 10/41
USPC ........... 60/641.8–641.15; 126/617–620, 683, 126/684, 688, 690, 698, 709
See application file for complete search history.

(56) References Cited

U.S. PATENT DOCUMENTS

| | | | |
|---|---|---|---|
| 1,661,473 | A | 3/1928 | Goddard et al. |
| 4,018,212 | A | 4/1977 | Hein et al. |

(Continued)

FOREIGN PATENT DOCUMENTS

| | | |
|---|---|---|
| CN | 201478330 U | 5/2010 |
| CN | 201478331 U | 5/2010 |

(Continued)

*Primary Examiner* — Hoang M Nguyen
(74) *Attorney, Agent, or Firm* — Fox Rothschild LLP

(57) ABSTRACT

Solar power collection systems characterized by using a collimated or otherwise concentrated beam of solar radiation to directly heat a porcelain or other high-heat capacity ceramic heating element by contact with an absorption surface on the element, which element in turn heats a thermal storage medium by conduction, methods of using the systems for collecting solar energy, and applications of the systems are disclosed.

11 Claims, 9 Drawing Sheets

Related U.S. Application Data

(60) Provisional application No. 62/141,488, filed on Apr. 1, 2015.

(51) Int. Cl.
*F24S 20/20* (2018.01)
*F24S 23/30* (2018.01)
*F24S 70/16* (2018.01)
*F24S 23/70* (2018.01)

(56) References Cited

U.S. PATENT DOCUMENTS

| | | |
|---|---|---|
| 4,402,306 A | 9/1983 | McElroy, Jr. |
| 4,449,515 A | 5/1984 | Nilsson, Sr. |
| 4,455,153 A | 6/1984 | Jakahi |
| 4,619,244 A | 10/1986 | Marks |
| 4,672,949 A | 6/1987 | O'Neill |
| 4,893,612 A | 1/1990 | Dawson |
| 5,408,990 A | 4/1995 | Edling et al. |
| 5,421,322 A | 6/1995 | Karni et al. |
| 5,448,889 A | 9/1995 | Bronicki |
| 8,087,245 B2 | 1/2012 | Quero et al. |
| 8,327,839 B2 | 12/2012 | Zillmer et al. |
| 8,770,186 B2 | 7/2014 | Clue |
| 8,794,229 B2 | 8/2014 | Shi |
| 8,847,142 B2 | 9/2014 | Zhou et al. |
| 10,371,126 B2 * | 8/2019 | Tibbott .......... F24S 60/00 |
| 2002/0083946 A1 | 7/2002 | Karni et al. |
| 2005/0011513 A1 | 1/2005 | Johnson |
| 2011/0000543 A1 | 1/2011 | Errico |
| 2011/0155124 A1 | 6/2011 | Karni |
| 2012/0138267 A1 | 6/2012 | Kinghorn et al. |
| 2012/0228883 A1 | 9/2012 | Cwik et al. |
| 2013/0147196 A1 | 6/2013 | Wieghardt |
| 2013/0206135 A1 | 8/2013 | Ko et al. |
| 2013/0213387 A1 | 8/2013 | Stettenheim et al. |
| 2013/0247961 A1 | 9/2013 | Pedretti |

FOREIGN PATENT DOCUMENTS

| | | |
|---|---|---|
| CN | 203224161 U | 10/2013 |
| DE | 102012201872 A1 | 8/2013 |
| EP | 2573484 A2 | 3/2013 |
| GB | 2486210 A | 6/2012 |
| WO | 2001/61254 A1 | 8/2001 |
| WO | 2008/153922 A1 | 12/2008 |
| WO | 2009101586 A2 | 8/2009 |
| WO | 2011/000522 A2 | 1/2011 |
| WO | 2011/055307 A2 | 5/2011 |

\* cited by examiner

SOLAR POWER COLLECTION SYSTEM AND METHODS THEREOF

CROSS REFERENCE TO RELATED APPLICATIONS

This application is a Continuation of U.S. patent application Ser. No. 15/563,364, filed Sep. 29, 2017, which is the U.S. National Phase of International Patent Application No. PCT/US2016/025481, filed Apr. 1, 2016, which, in turn, claims priority to U.S. Provisional Patent Application Ser. No. 62/141,488, filed Apr. 1, 2015. The disclosures of all the applications are incorporated herein by reference in their entirety.

FIELD OF THE INVENTION

This disclosure relates to solar power collection systems and methods of using the systems to collect solar power for consumptions.

BACKGROUND OF THE INVENTION

Concentrated solar power (CSP) collectors have been increasingly used in recent times in conjunction with thermal storage media such as molten salts in order to maximize the conversion of solar energy collected into usable mechanical work. For example salt-based thermal storage media have been used in large-scale solar-thermal power projects to extend power output to periods when the sun is not shining. Existing solar collectors use parabolic mirrors, dish shaped mirrors, Fresnel lenses, and other lens and mirror configurations to focus solar energy on flat panel or evacuated tube collectors, which in turn provide heat to a thermal storage medium or heat exchanger.

Evacuated tube and flat panel collectors usually work by using the collected solar energy from parabolic, dish, flat panel or linear Fresnel collectors to heat an absorption medium that then heats a heat transfer fluid such as molten salts or anti-freeze chemicals such as propylene glycol, and this fluid is then used to heat a thermal storage medium or to generate steam or other hot gases via a heat exchanger. While this approach accommodates high temperatures in the heat transfer fluid, in the range of 300-400 degrees Celsius, the thermal storage media, often phase change materials such as nitrate salts and other molten salt mixtures, can directly absorb much higher temperatures without boiling. However, most existing solar collectors such as parabolic or flat panel collectors are not configured to produce higher heating temperatures, and utilize heat transfer fluids to transfer heat to the thermal storage media, likely due to the difficulty of absorbing temperatures that could damage existing flat panel or evacuated tube collectors and to difficulties in pumping thermal storage media. For example, parabolic collectors focus the incident solar radiation across only a single spatial dimension onto long evacuated tube collectors, resulting in radiative, convective, and other thermal losses across the large area of the collector surface. Projects using molten salts as heat transfer fluids also suffer from challenges resulting from the high freezing temperature of the salt media and the resulting damage to piping system. Current projects that use solar radiation to directly heat the thermal storage media at a central point of absorption, such as solar tower projects utilizing salt storage media, currently focus the solar radiation via large heliostat mirrors, thus posing a danger to passersby and birds and losing a great deal of energy to reflection back into the environment and to inefficiencies in mirror technology. This method also suffers from so-called "cosine losses" resulting from imperfect focusing of the solar radiation on the central absorber tower.

SUMMARY OF THE INVENTION

The present disclosure presents an alternative form of solar power collection that utilizes a collimated or substantially collimated or otherwise substantially concentrated beam of solar radiation, for example that produced by a Fresnel lens in conjunction with a converging or diverging lens or by an appropriately shaped mirror surface, to directly heat a porcelain or other high heat capacity ceramic heating element by contact of the beam with a concave or conical depression on the element, which element may be placed in direct contact with or very near a thermal storage medium, such as a phase change material, in a way shown. The heating element transfers heat energy to the thermal storage medium by conduction. Porcelain has been used for thousands of years due to its toughness and extreme resilience to thermal stress. The resulting solar absorbing device produces minimal reflection of the incident solar radiation into the environment, rendering it suitable for residential use.

In one aspect, the present invention provides a solar power collecting system, comprising: a means of forming a collimated beam of solar radiation; a heating element; and a thermal storage medium, wherein said heating element can withstand heating from the collimated or otherwise concentrated beam of solar radiation without breaking; and wherein said collimated or otherwise concentrated beam directly heats said heating element through contact with a conical or concave depression on the element; and wherein said heating element transfers solar energy to the thermal storage medium directly by conduction.

In another aspect, the present invention provides use of a solar power collecting system according to any one of the embodiments described herein, or any combinations thereof, for collecting solar energy.

In another aspect, the present invention provides a method of powering an energy consumption apparatus, the method comprising collecting solar power by using a solar power collecting system according to any one of the embodiments described herein, or any combination thereof, and powering the energy consumption apparatus using the solar power collected.

In one embodiment presented in this disclosure, a collimated beam of electromagnetic radiation is focused on the inside cavity of a conical porcelain heating element, and its outside portion is submerged or embedded directly in the thermal storage medium. The outside portion of the element may optionally be protected from the storage medium by a metal sheath with high thermal conductivity. Beams produced by square meter Fresnel lenses can produce spot temperatures in excess of 500 degrees Celsius on various material surfaces in environments with average sun insolation, which is in a range that porcelain and other ceramics can absorb without breaking, and which could produce molten salt for heat storage.

Phase change materials with latent heats of fusion such as certain nitrate salt mixtures, e.g. so-called solar salt—a 60-40 mixture of sodium nitrate and potassium nitrate—as well as other salt mixtures, such as those containing sodium sulfate and hydrates thereof, sodium chloride, ammonium chloride, magnesium sulfate, other nitrate salts such as calcium nitrate and hydrates thereof, sodium nitrate and potassium nitrate, packed clays, and ceramic itself present good candidates for the thermal storage medium.

The use of a Fresnel lens in conjunction with a converging or diverging lens to produce a collimated beam need make no use of focusing mirrors, though it may use mirrors to change the direction of the light beam, and thus loses minimal solar radiation energy to reflection back into the device's environment or to inefficiencies in the reflectivity of mirror surfaces. The solar collection cell presented in this disclosure is designed to absorb the resulting intense electromagnetic radiation without breaking and with minimal radiative losses, and in a way that results in high proportions of the absorbed energy being available for use in various applications.

The thermal storage chamber formed by the solar collection method presented in this disclosure could be utilized for a number of useful purposes, such as the production of solar-thermal power in various configurations, for example, for use as an evaporator for driving organic Rankine cycles for power generation, for water heating, snow melting or the prevention of snow buildup, for the creation of high-pressure steam to power engines, or to generate power through high pressure steam or other gases for powering a series of vortex tubes arrayed with Peltier thermoelectric generator elements, various culinary applications, and other uses of heat in human affairs.

DETAILED DESCRIPTION OF THE INVENTION

Figure 1:
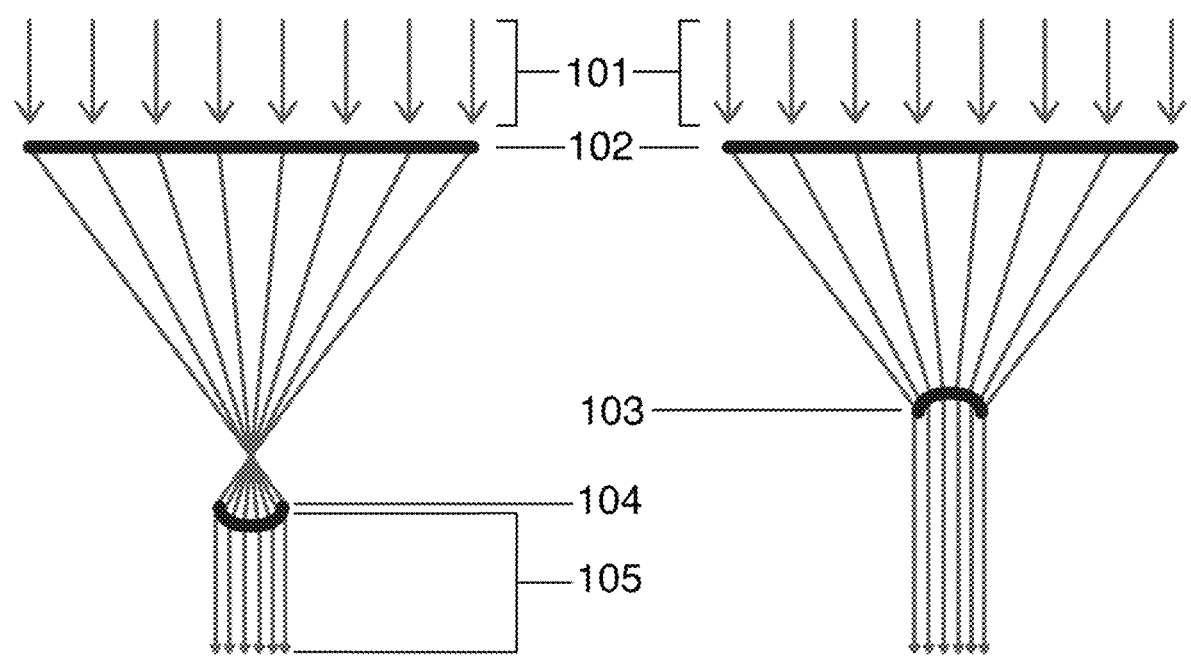
FIG. 1 illustrates collimated beam production with Fresnel lens and converging or diverging lens.

In one aspect, the present invention provides a solar power collecting system, comprising: a means of forming a collimated or otherwise concentrated beam of solar radiation; a heating element; and a thermal storage medium, wherein said heating element can withstand heating from the collimated or otherwise concentrated beam of solar radiation without breaking; and wherein said beam directly heats said heating element through contact with a conical depression or concave surface on the element; and wherein said heating element transfers solar energy in the form of thermal energy to the thermal storage medium by conduction.

In one embodiment of this aspect, the means of forming a collimated or otherwise concentrated beam of solar radiation comprises a Fresnel lens in conjunction with a converging or diverging lens.

In another embodiment of this aspect, the means of forming a collimated beam of solar radiation comprises a Fresnel lens whose focal point is positioned at the top of a tube with reflective interior surface, the top of which has a section that tapers to an opening into which the light is focused, wherein the tapered portion is bent such that it resembles the bell of a trumpet aimed into the rest of the tube.

In another embodiment of this aspect, the heating element is placed in direct contact with the thermal storage medium to enable efficient transfer of the heat energy from the heating element to the thermal storage medium by conduction.

In another embodiment of this aspect, the heating element is separated from the thermal storage medium by a metal sheath.

In another embodiment of this aspect, the heating element is of a shape comprising a conical or concave interior cavity and an exterior wall so that the collimated or otherwise concentrated beam of solar radiation is aimed at the interior cavity of the heating element.

In another embodiment of this aspect, the interior cavity of the heating element forms a cone or concave depression comprising angled walls that meet at a point at the bottom of the heating element's interior cavity; and wherein the diameter of the cone or concave depression is equal to or greater than the diameter of the collimated beam.

In another embodiment of this aspect, the angled walls of the heating element taper across the diameter of the collimated or otherwise concentrated beam, thus collecting the electromagnetic radiation from the beam across the height of the conical or concave interior cavity of the heating element.

In another embodiment of this aspect, the exterior wall of the heating element is placed in direct contact with the thermal storage medium.

In another embodiment of this aspect, the collimated or otherwise concentrated beam of electromagnetic radiation is focused on the interior cavity of the heating element, and the exterior wall of the heating element is submerged or embedded directly in the thermal storage medium.

In another embodiment of this aspect, the heating element is made of a ceramic material.

In another embodiment of this aspect, the heating element is made of vitrified porcelain with its surface of interior cavity optionally coated by a layer of oxide-rich glaze in order to enhance absorption of the incident solar radiation and to act as a heat sealant.

In another embodiment of this aspect, the exterior surface of the heating element which is placed in contact with or faces the thermal storage medium is textured to increase its surface area.

In another embodiment of this aspect, the texture of the surface that is placed in contact with or faces the thermal storage medium is textured with a honeycomb pattern.

In another embodiment of this aspect, the surface of the heat absorber element which is in contact with or faces the thermal storage medium is embedded with nichrome wires to increase thermal diffusivity.

In another embodiment of this aspect, the thermal storage medium comprises a mineral salt or mixture of salts capable of changing phase to store the energy when absorbing the heat transferred from the heating element.

In another embodiment of this aspect, the thermal storage medium is selected from the group consisting of sodium sulfate and hydrates thereof, magnesium sulfate, ammonium chloride, sodium chloride, ceramics, nitrate salts such as calcium nitrate and hydrates thereof, potassium nitrate, and sodium nitrate, and mixtures thereof.

In another embodiment of this aspect, the thermal storage medium is sodium chloride.

In another embodiment of this aspect, the thermal storage medium is a 60-40 mixture of sodium nitrate and potassium nitrate.

In another embodiment of this aspect, the thermal storage medium is coupled with an energy consumption apparatus through a heat transfer means so that the heat energy stored in the thermal storage medium can be used by the energy consumption apparatus.

In another embodiment of this aspect, the solar power collecting system further comprises a solar tracking means to ensure a stationary orientation of said collimated or otherwise concentrated beam of solar radiation in order to make optimal use of the solar insolation throughout the day.

In another embodiment of this aspect, the solar power collecting system is coupled with a solar tracking apparatus or a device producing a collimated or otherwise concentrated beam of solar radiation with stationary orientation as the sun light changes directions throughout the day.

In another embodiment of this aspect, the heating element is heated by the collimated or otherwise concentrated beam of solar radiation focused directly onto the heating element's concave or conical interior surface, while the exterior surface of the heating element is placed in direct contact with the thermal storage medium.

In another embodiment of this aspect, the heating element is shaped so as to avoid excessive thermal stress to it while heat transfer between the heating element and the thermal storage medium is maximized.

In another embodiment of this aspect, the collimated or otherwise concentrated beam of solar radiation is produced using a Fresnel lens in conjunction with a converging lens or diverging lens as substantially shown in FIG. 1a or 1b, respectively.

In another embodiment of this aspect, the thermal storage medium surrounds the heating element and is contained in a capsule made of a ceramic, stainless steel, or another corrosion and heat resistant material.

In another embodiment of this aspect, the heating element forms a lid of the capsule; and wherein optional ventilation holes or other shaped openings are placed in the top or other areas of the heating element or in the capsule, or optional pressure valves are integrated, to allow release of pressure built up in the capsule.

In another embodiment of this aspect, the capsule comprises a sufficient empty space to accommodate volume change caused by phase change of the thermal storage medium.

In another embodiment of this aspect, the capsule is encased in a refractory material for added insulation, or partially surrounded by a vacuum as in a Dewar tube.

In another embodiment of this aspect, the thermal storage medium forms a thermal storage chamber stored underground or partially underground so that the surrounding earth serves as insulation.

In some embodiments, the solar power collecting system comprises an array of thermal storage chambers, wherein each interior chamber is surrounded by an outer chamber separated by a thermally conductive material, and each chamber holds a phase change material as thermal storage medium.

In some embodiments, said array of thermal storage chambers comprise two, three, four, or five chambers; and wherein said phase change material in each outer chamber has a lower melting point than the phase change material in the adjacent interior chamber.

In another embodiment of this aspect, the solar power collecting system further comprises a thermally conducting tubing or finned tubing to be in contact with said thermal storage medium, so that a working fluid can pass through the tubing which in turn passes through the thermal storage chamber formed by the thermal storage medium and serves as a source of heat energy to the working fluid.

In another embodiment of this aspect, the working fluid in said tubing acts as a boiler or evaporator to power an engine or turbine.

In another embodiment of this aspect, the tubing is made from a material selected from stainless steel or ceramic.

In another embodiment of this aspect, the tubing or finned tubing is threaded through larger extruded ceramic or thermally conductive plastic pipes that pass through the thermal storage medium, wherein optionally a plurality of pipes or finned tubes of a small diameter are used to ensure rapid heat transfer from the thermal storage medium to the working fluid.

In another embodiment of this aspect, the heating pipes coil around the tip of the heating element's exterior surface.

In another embodiment of this aspect, the working fluid is pumped through a gravity-feed system into the heat cell to allow for optimal net energy production.

In another embodiment of this aspect, a one-way valve is placed at the inlet to the thermal storage chamber to ensure the working fluid flows only towards the outlet.

In another embodiment of this aspect, the one-way valve comprises a Tesla valvular conduit.

In another embodiment of this aspect, the gravity-feed or pump system comprises a feeding tank to feed the working fluid to the heat cell/boiler.

In another embodiment of this aspect, the feeding tank is placed in a close proximity to the heat cell to enable recapture of the heat lost from the cell with the fluid or other medium contained in the tank. The tank could also be used as a heat recuperator in an organic Rankine cycle.

In other embodiments, the present invention encompasses any and all reasonable combinations of the embodiments as substantially described and shown herein.

In another aspect, the present invention provides use of a solar power collecting system according to any one of the embodiments described herein, or any combinations thereof, for collecting solar energy.

In another aspect, the present invention provides a method of powering an energy consumption apparatus, the method comprising collecting solar power by using a solar power collecting system according to any one of the embodiments described herein, or any combination thereof, and powering the energy consumption apparatus using the solar power collected.

In one embodiment, the energy consumption apparatus is an evaporator for an organic Rankine cycle.

In another embodiment, the energy consumption process is selected from production of solar-thermal power, water heating, snow melting, prevention of snow buildup, the creation of high-pressure steam, power generation through high pressure steam; as an evaporator to heat refrigerant fluids to power an Organic Rankine Cycle; and said energy consumption apparatus is selected from power engines, hydraulic engines such as gerotor motors, steam engines, turbines, vortex tube coolers, a series of vortex tubes arrayed with Peltier generators, culinary applications, and other uses of heat in human affairs.

In another embodiment, the thermal storage chamber is used as a boiler or evaporator to power home steam turbines or steam engine based generators, or organic rankine cycles using scroll or gerotor expanders, or to provide hot water and steam heat.

In another embodiment, the thermal storage chamber is used to heat cooking stones for use as cook surfaces, or to heat ovens.

In another embodiment, the cell is used as a cook surface after the cell is removed from the source of solar radiation.

In another embodiment, the thermal storage chamber produced by the heating element is used to generate steam or other heated vapors for powering vortex tubes, which separate pressured gas into hot and cold streams, which may be used for low-scale electricity generation using Peltier generators operating on the Seebeck effect.

In another embodiment, the cold and hot ends of vortex tubes are oriented towards the cold and hot ends of a Peltier thermoelectric generator element, in a looped series.

In the following some more specific, non-limiting examples or embodiments are provided to further illustrate certain aspects of the present invention with reference to the Figures.

FIG. 1 illustrates an embodiment for collimated beam production with Fresnel lens and converging or diverging lens, wherein 101 represents sunbeams, 102 represents Fresnel a lens, 103 represents a diverging lens, 104 represents a converging lens, and 105 represents collimated or otherwise concentrated beams.

Figure 2A:
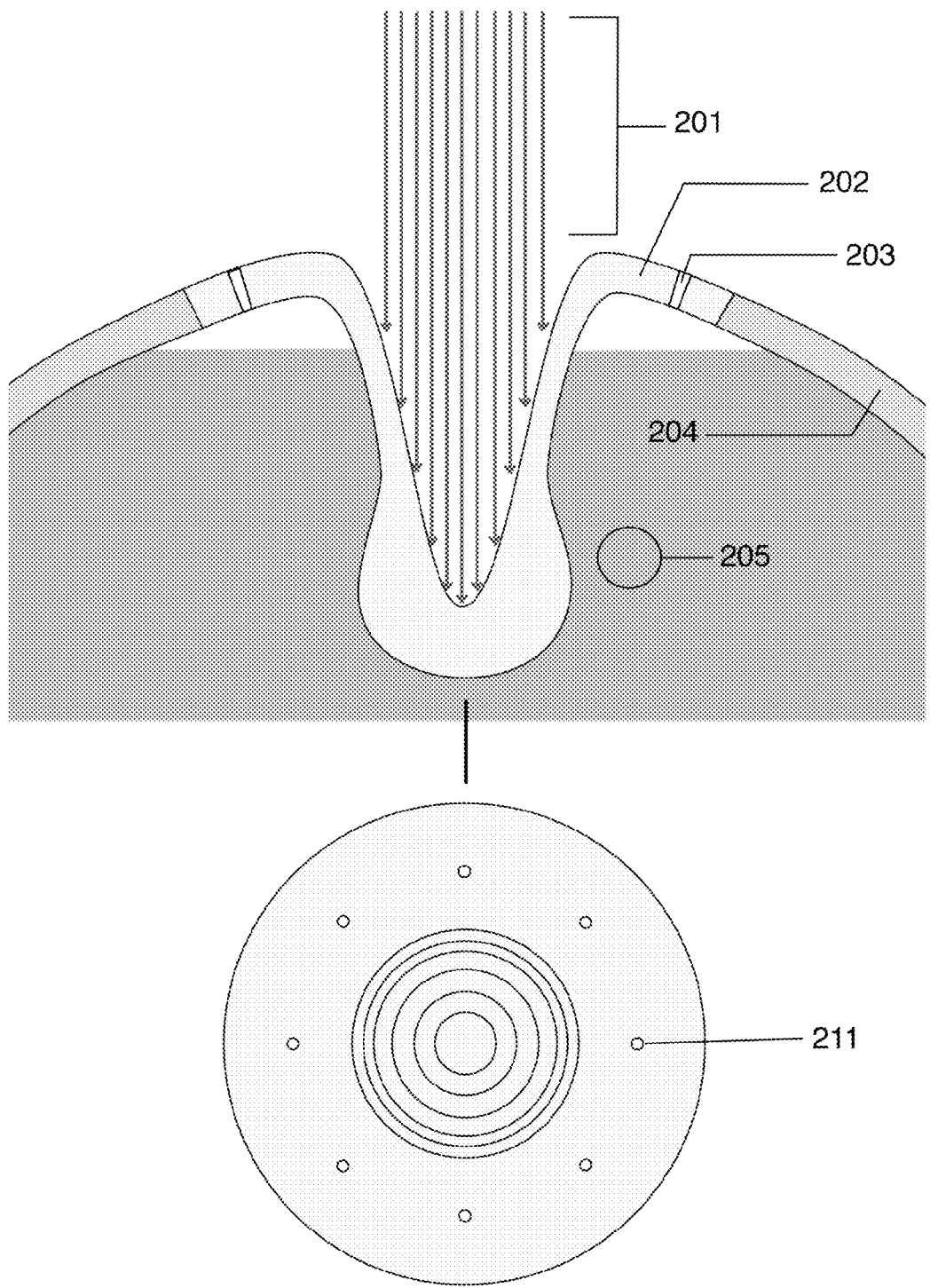
FIG. 2A illustrates a ceramic heating element (the cross-section view and top view) with conical or concave interior cavity.

FIG. 2A illustrates an embodiment of a ceramic heating element (the cross-section view and top view) with conical or concave interior cavity. In the cross-sectional view, 201 represents collimated or otherwise concentrated beams; 202 represents a ceramic heating element; 203 represents a ventilation hole; 204 represents a salt storage receptacle, which can be made of ceramic, stainless steel, or other materials; and 205 represents a salt medium. In the top view, 211 represents ventilation hole.

Figure 2B:
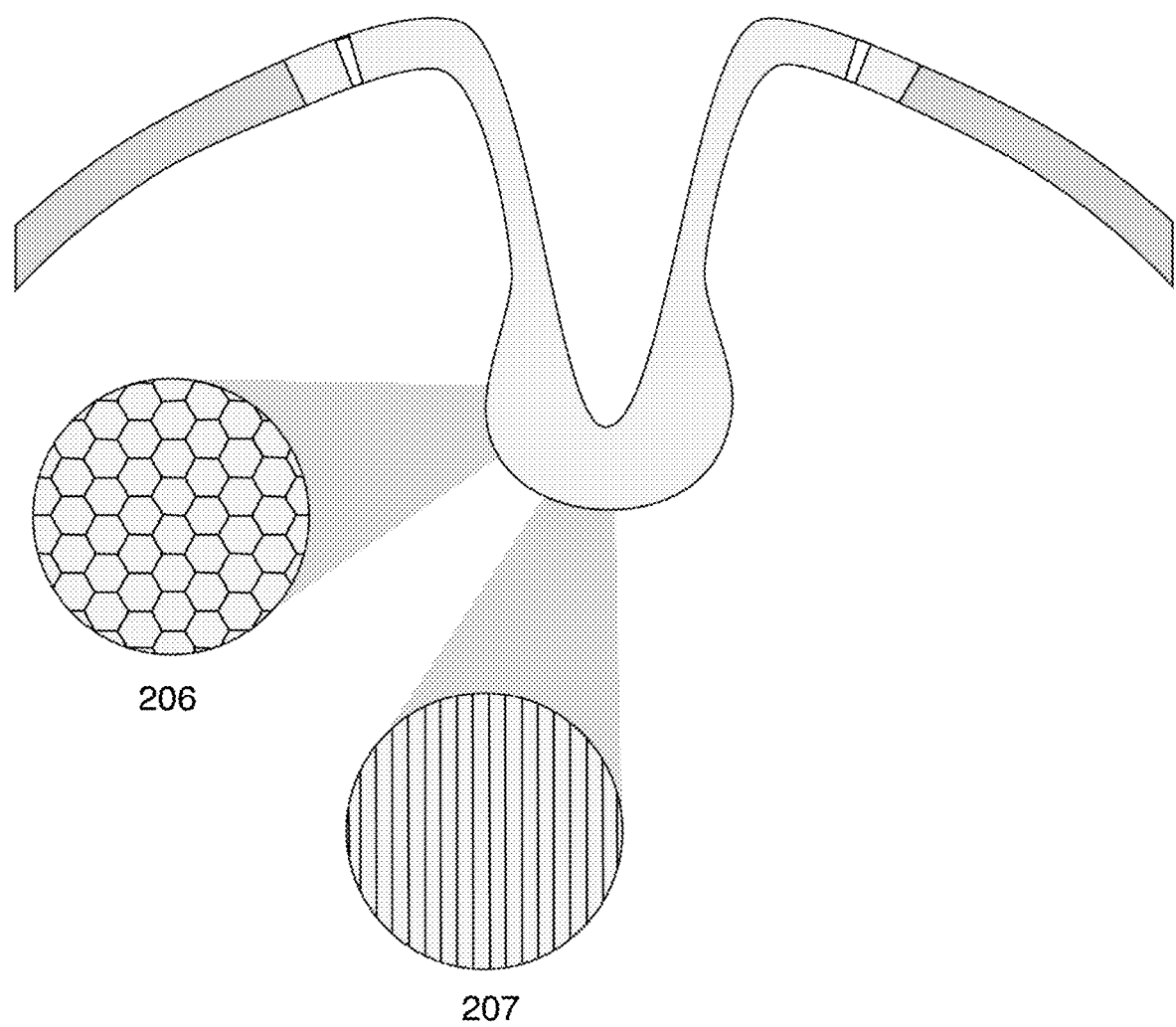
FIG. 2B illustrates the ceramic heating element with two examples of surface textures to increase surface area.

FIG. 2B illustrates the ceramic heating element with two examples of surface textures (206 and 207) to increase surface area.

Figure 2C:
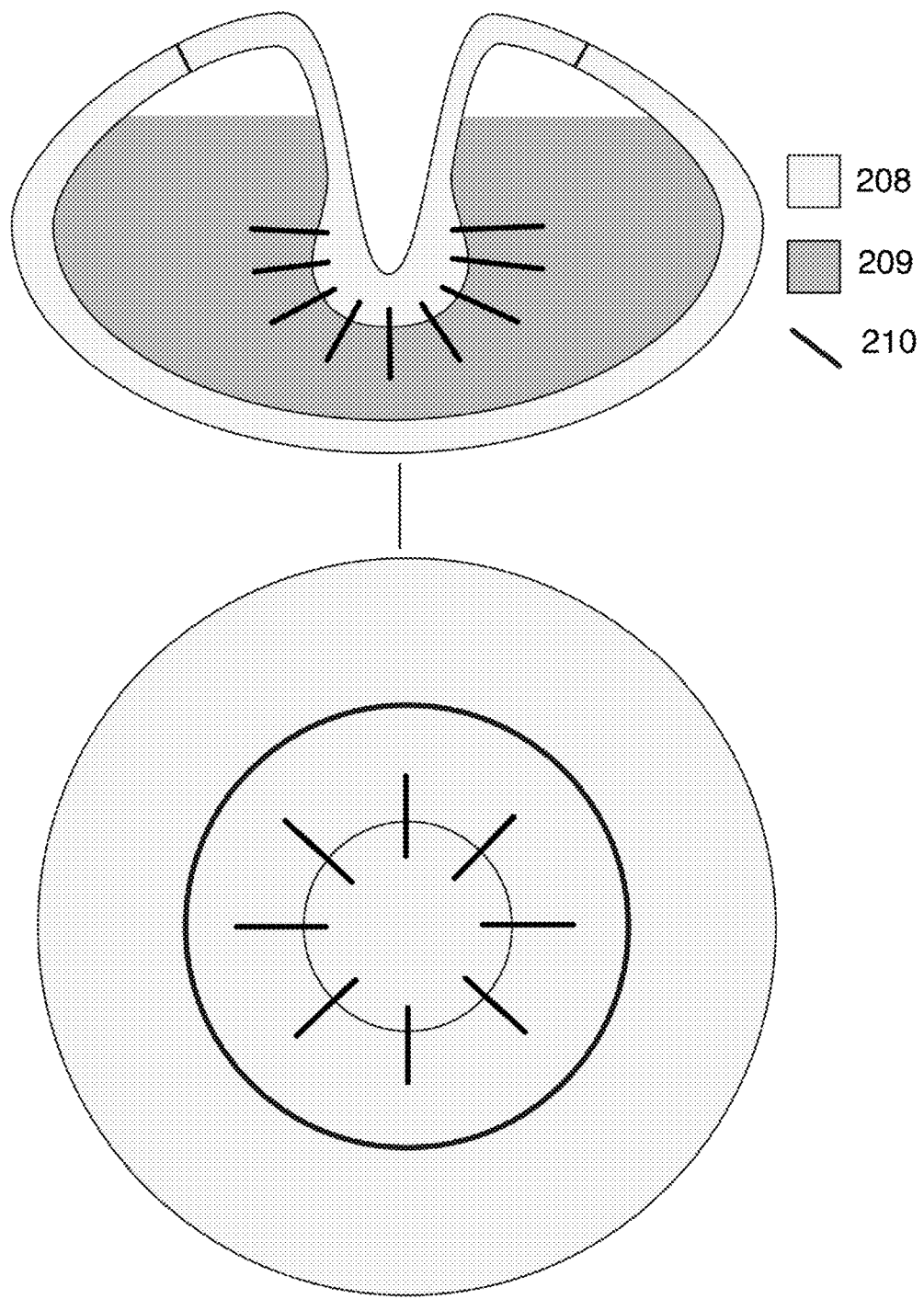
FIG. 2C illustrates the ceramic heating element with nichrome wire attachments in vertical cross section and in top view with the lid of the storage capsule transparent.

FIG. 2C illustrates an embodiment of the ceramic heating element with nichrome wire attachments in vertical cross section and in top view with the lid of the storage capsule transparent (208—ceramic; 209—salt medium; and 210—embedded nichrome wire).

Figure 3:
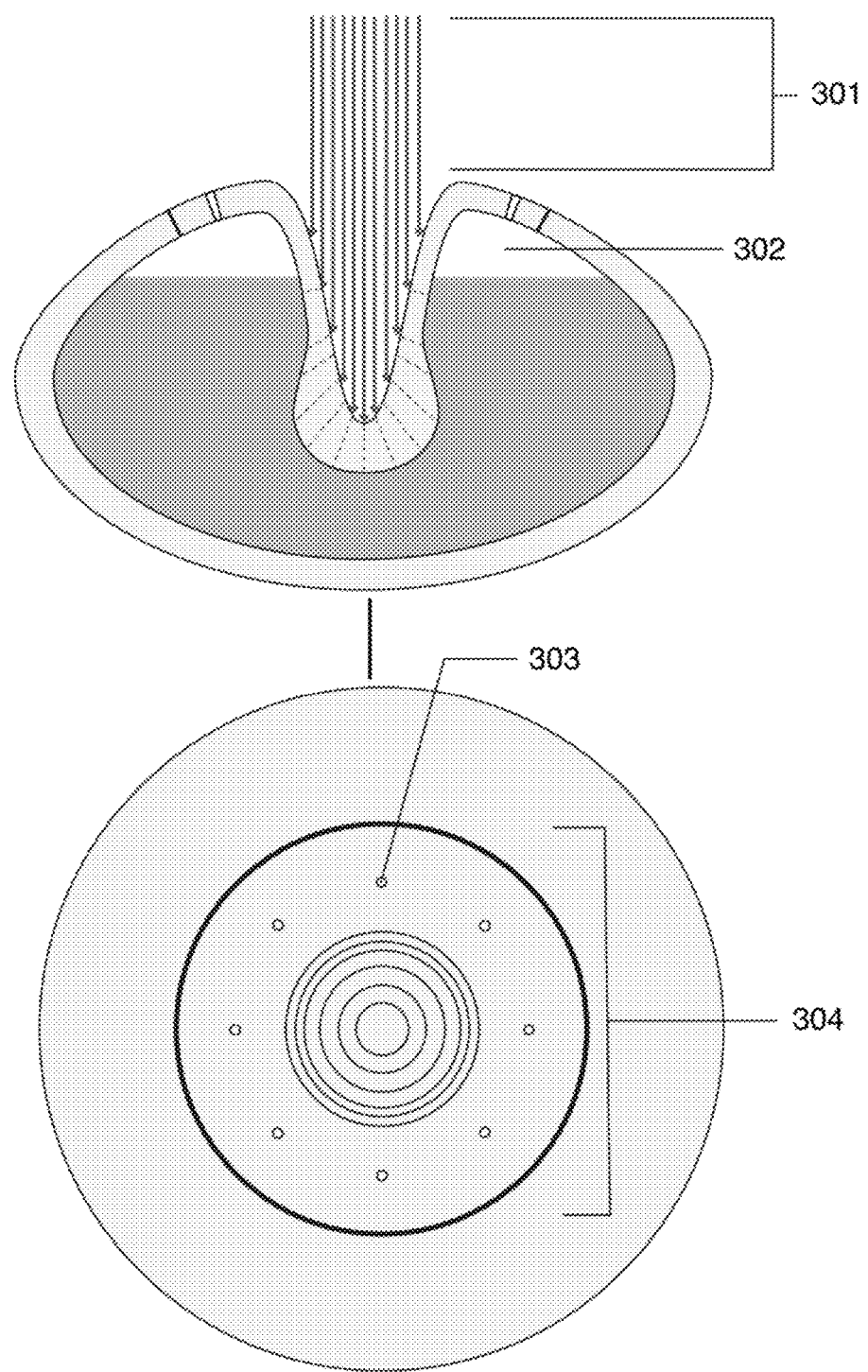
FIG. 3 illustrates a ceramic heating element (the cross-section view and top view) and thermal storage chamber indicating void for volume change of a thermal storage medium.

FIG. 3 illustrates an embodiment of the ceramic heating element (the cross-section view and top view) and thermal storage chamber indicating void for volume change of a thermal storage medium (in the cross-sectional view, 301—collimated beam, 302—void for volume change of thermal storage; in the top view, 303—ventilation holes, 304—capsule lid).

Figure 4:
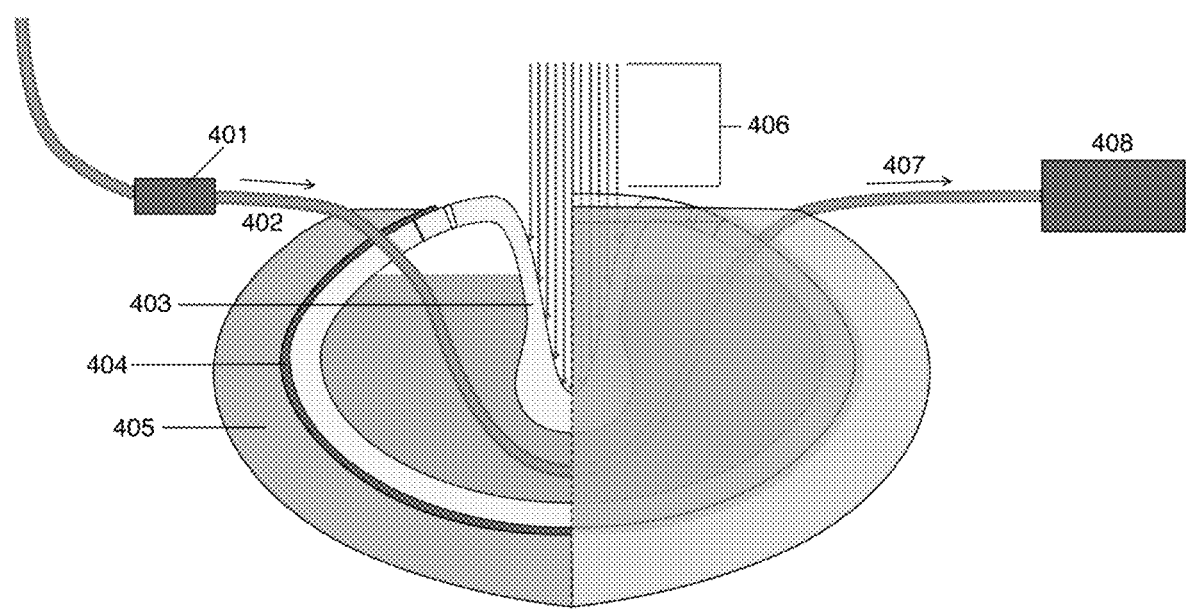
FIG. 4 illustrates a setup of the solar power collection system containing a refractory casing coupled with a boiler/evaporator system.

FIG. 4 illustrates a setup of the solar power collection system containing a refractory casing coupled with a boiler/evaporator system (401—valve, e.g, a Tesla one-way valve; 402—inlet of gravity feed or pump feed; 403—ceramic cell; 404—stainless steel casing; 405—refractory casing; 406—collimated or otherwise concentrated beam; 407—outlet; and 408—engine).

Figure 5:
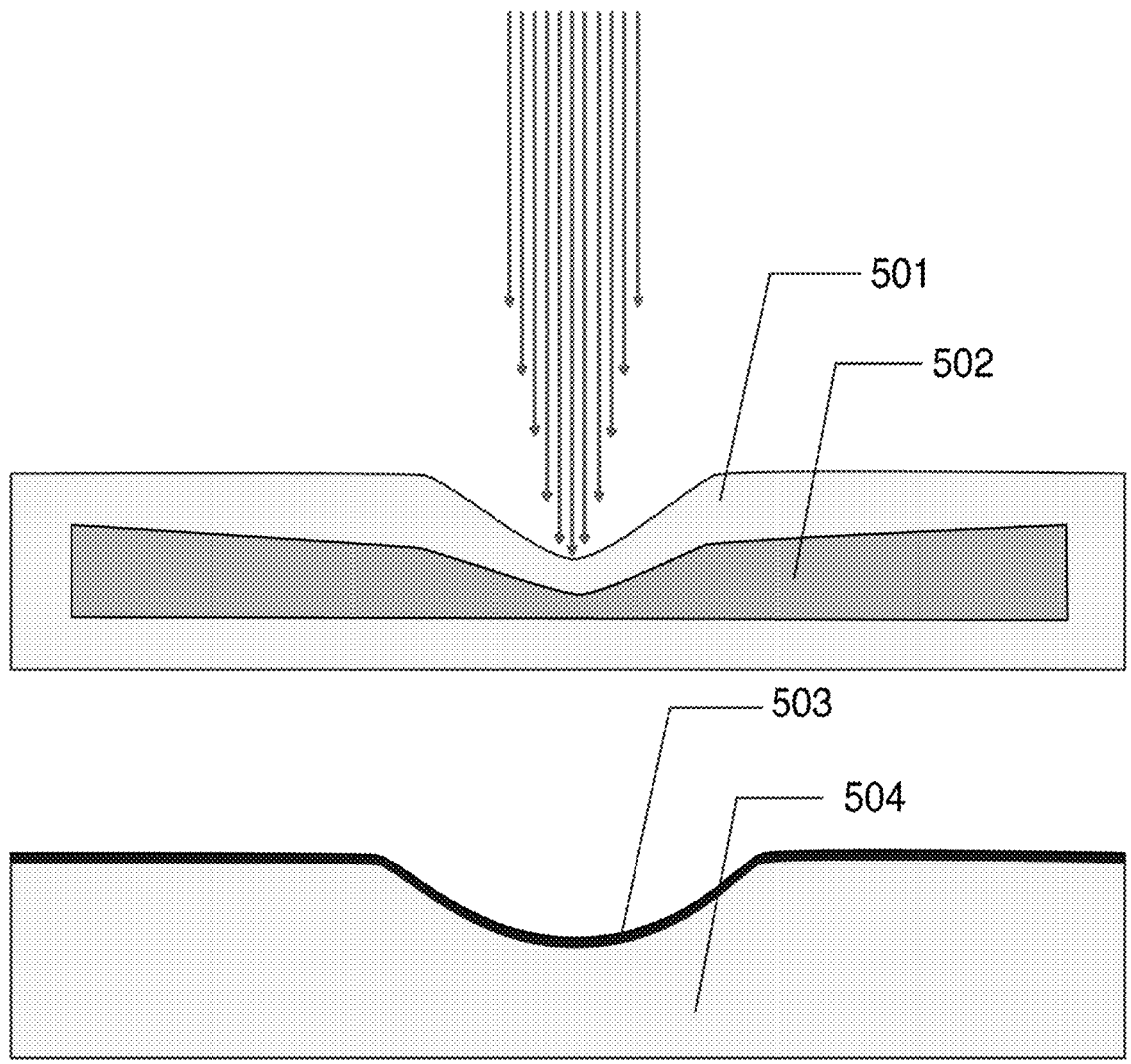
FIG. 5 illustrates a culinary application of the solar power collection system.

FIG. 5 illustrates a culinary application of the solar power collection system (501—ceramic cell; 502—salt reservoir; 503—oxide surfacing (glaze); and 504—ceramic cell).

Figure 6:
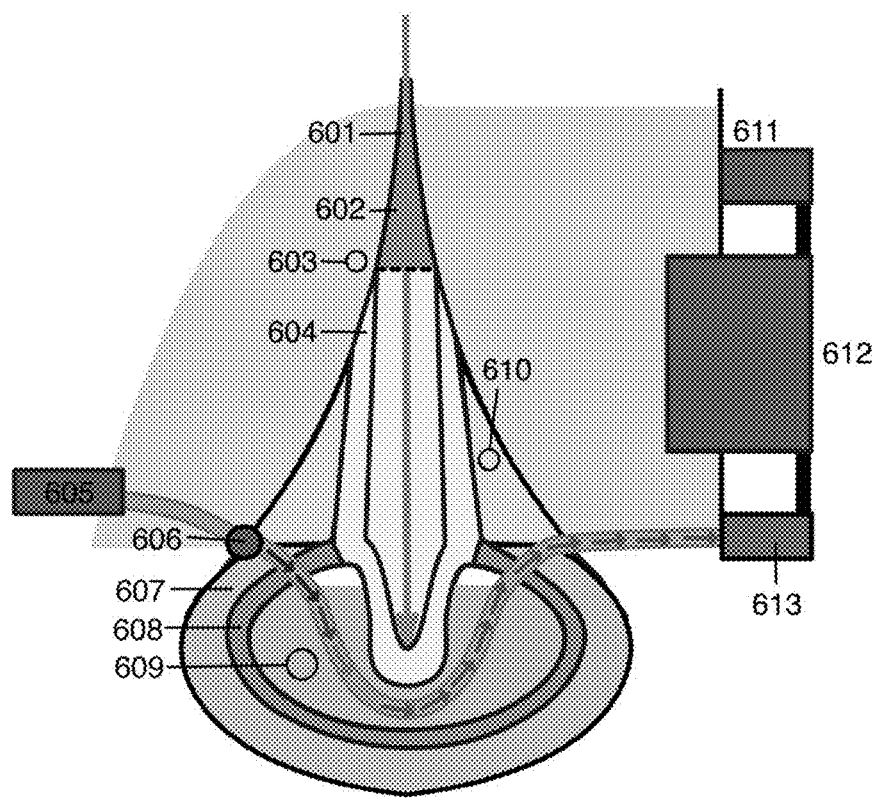
FIG. 6 illustrates a setup of the solar power collection system as an evaporator for an Organic Rankine Cycle, showing the possible position of an optional cooling/regeneration tank, and a trumpet-bell shaped mirrored chamber to redirect and collimate or otherwise concentrate the solar radiation.

FIG. 6 illustrates a setup of the solar power collection system as an evaporator for an Organic Rankine Cycle, showing the possible position of an optional cooling/regeneration tank, and a trumpet-bell shaped mirrored chamber to redirect and collimate or otherwise concentrate the solar radiation (601—solar radiation; 602—"trumpet bell" reflector; 603—liquid condenser medium; 604—reflective chamber; 605—pump; 606—check valve; 607—refractory casing; 608—metal casing; 609—salt medium; 610—insulation; 611—condenser; 612—regenerative heat exchanger; and 613—expander/generator).

Figure 7:
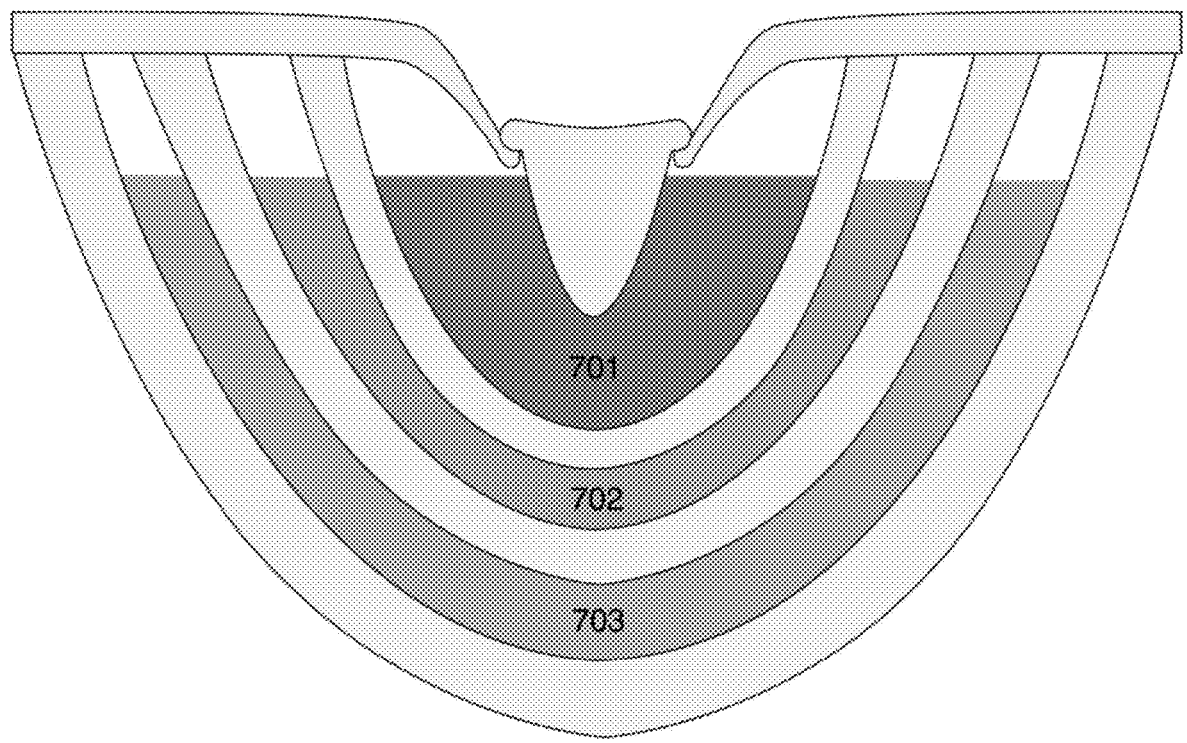
FIG. 7 illustrates an embodiment of the solar absorber with staged chambers emanating away from the central heat absorption point and containing phase change materials with progressively lower melting points.

FIG. 7 illustrates an embodiment of the solar absorber with staged chambers emanating away from the central heat absorption point and containing phase change materials (PCM) with progressively lower melting points (701—highest melting point PCM; 702—medium melting point PCM; 703—lowest melting point PCM).

Figure 8:
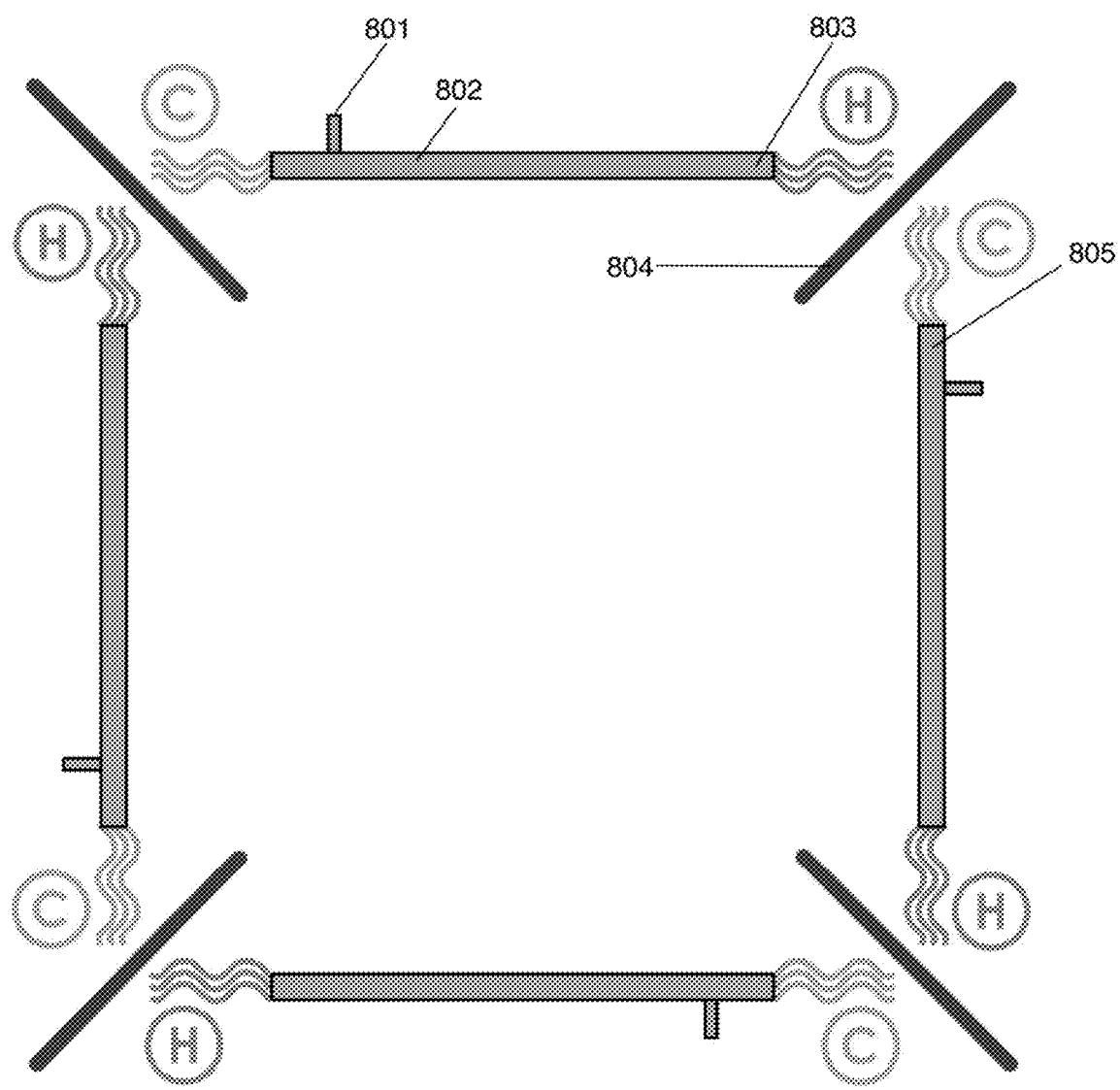
FIG. 8 illustrates a vortex tube-Peltier series generator system.

FIG. 8 illustrates a vortex tube-Peltier series generator system (801—steam inlet; 802—vortex tube; 803—hot outlet; 804—Peltier thermoelectric generator; 805—cold outlet).

In various embodiments, an apparatus and method is presented for collecting solar radiation to heat a thermal storage medium with a high heat storage capacity such as a phase change material, e.g. solar salt, using a porcelain or other high heat capacity ceramic heating element (FIG. 2 and FIG. 3). The heating element 202 is heated by focusing a collimated or otherwise concentrated beam 201 of solar radiation directly onto a conical depression in or concave interior surface on the element 202 (FIG. 2A) (or 403, FIG. 4) while the opposite side of the element is placed in direct contact with the storage medium 205. The element 202 (FIG. 2A) (or 403, FIG. 4) is shaped to prevent excessive thermal stress to the element while maximizing heat transfer between the heating element and the thermal storage medium 205 by conduction. In one embodiment, the element may be conically or spherically shaped 202 (FIG. 2A) (or 403, FIG. 4), and the surface of the element which is in contact with the thermal storage medium 205 (FIG. 2A) (or 609, FIG. 6) is textured 206-207 (FIG. 2B) to produce a high surface area to increase heat absorption, for example in a honeycomb-like pattern 206 (FIG. 2B). In one embodiment, to prevent degradation, the porcelain absorber element is separated from the thermal storage medium by a metal sheath, and the space between the sheath and the absorber element is filled with a protective material such as various clays. In another embodiment (FIG. 2C), nichrome wire 210 can be fused directly to the portion of the absorber element 208 exposed to or near the thermal storage medium 209 in order to encourage thermal diffusion into the storage medium.

The collimated beam of solar radiation may be produced using a Fresnel lens in conjunction with a converging lens 104 or diverging lens 105 (FIG. 1A and FIG. 1B, respectively). This method makes optimal usage of the solar radiation entering an area of space. In one embodiment (FIG. 6), the light could alternatively be collimated or substantially collimated by positioning a mirrored chamber 604 with the top portion in the shape of a trumpet bell 602 as shown in FIG. 6, such that the opening of this chamber 602 was near the focal point of the Fresnel lens. The bottom of the mirrored chamber 604 would join at the top of the thermal storage chamber 608 such that the collimated or otherwise concentrated beam would strike the interior of the porcelain absorber element 202 (FIG. 2A) (or 403, FIG. 4). However the solar collection method presented in this disclosure is not limited to this method of generating the collimated or otherwise concentrated beam of solar radiation.

The beam is aimed at an interior cavity of a porcelain or other ceramic element 202 possessing a high resilience to thermal stress. The general shape of the heating element is shown in FIG. 2A, which illustrates a vertical cross section of the heating element: the interior cavity of the heating element forms a cone or concave depression 202 (FIG. 2A) (or 403, FIG. 4) with angled or arcing edges that meet at a point at the bottom of the heating element's interior cavity. The diameter of the cone or conical cavity 202 (FIG. 2A) (or 403, FIG. 4) is chosen to be equal to or greater than the diameter of the collimated or otherwise concentrated beam that focuses upon it 201 (FIG. 2A).

The arcing or angled edges (FIG. 2A and FIG. 3) of the interior of the heating element 202 (FIG. 2A) (or 403, FIG. 4) allow the solar radiation to be distributed across a substantial portion of the height of the heating element's interior surface, preventing the intense power of the collimated or otherwise concentrated beam 201 from generating unacceptable thermal stress in the heating element and/or differential thermal stress across the heating element's mass. The angled walls taper across the diameter of the collimated beam, thus collecting the electromagnetic radiation from the beam across the height of the conical or concave interior cavity 202 (FIG. 2A) (or 403, FIG. 4) of the heating element.

One material option for the makeup of the ceramic heating element is fully vitrified porcelain. This material's high melting point, relative impermeability, and overall strength make it a good choice as a point of accumulation and distribution of heat. Additionally, the material's lack of metallic content—particularly in oxide form—greatly lowers the potential for unit-destructive corrosion on the heating element's interior and exterior surfaces. However, a dark oxide-rich glaze may be applied to the surface of the heating element's interior cavity in order to enhance absorption of the incident solar radiation 201, and to act as a heat sealant.

In one embodiment, the exterior portion of the heating element is placed in direct contact with the thermal storage medium 205, 609 (FIGS. 2A and 6). In some embodiments, salt mixtures containing sodium sulfate or hydrates thereof, ammonium chloride, sodium chloride, magnesium sulfate, nitrate salts and nitrate salt mixtures such as solar salt can be used as a thermal storage medium due to their high sensible and latent heat capacity, low cost and high availability and their lack of apparent degradation in thermal storage capacity after long exposures to high heat and thermal cycling. The salt or other thermal storage medium 205 surrounds the cone of the heating element 202 (FIG. 2A) (or 403, FIG. 4) and can be held in a stainless steel or ceramic capsule 204 (FIG. 2A), 404 (FIG. 4) or a capsule made of another corrosion and heat resilient material. In order to increase the thermal conductivity of the heat storage medium 205, 609 (FIGS. 2A and 6), in one embodiment it may be suffused with or poured over a metal mesh, such as one made from aluminum. One possible configuration is shown in FIGS. 2-4, showing the heating element forming the cap 202, 403, 304 of a thermal storage capsule. The heat is thus transferred directly from the heating element to the thermal storage medium by conduction. When used with a phase change material such as solar salt as the thermal storage medium, a gap of space 302 (FIG. 3 top view) can be left to allow for volume change in the material. Optional small ventilation holes 303 (FIG. 3) or other shaped openings can be placed in the top of the heating element or in the capsule, or optional pressure valves can be integrated, to allow for pressure buildup in the cell to dissipate.

In various embodiments, the heating element 202, 403 and thermal storage medium 205 may form the lid of a capsule 204, 404 made of ceramic, stainless steel, high heat-capacity plastics or other appropriate material or materials for the purpose of providing insulation to the thermal storage medium 205, 609 and protection against corrosion by the thermal storage medium (FIGS. 2A and 4). The capsule may contain sufficient empty space 302 to accommodate volume change in the phase change thermal storage material. The entire capsule may in turn be encased in a refractory material 405 for added insulation (FIG. 4), and/or partially surrounded by a vacuum as in a Dewar tube 404. In various embodiments, stainless steel, ceramic or other tubing 402, 407 can allow water or another working fluid to pass through the thermal storage chamber formed by the thermal storage medium 205, 609 to allow it to act as a boiler or evaporator to power an engine or turbine 408, 613 or for other uses (FIG. 4 and FIG. 6). In one embodiment, the thermal storage chamber is used as the evaporator in an organic Rankine cycle (FIG. 6), which may use a scroll compressor in reverse or a gerotor motor as the expander element 613.

In order to make optimal use of the solar insolation throughout the day, the method described in this disclosure would optimally be used in conjunction with a solar tracking method, or with a method of producing a collimated beam of solar radiation with stationary orientation as the sun moves throughout the day as described in U.S. Pat. Nos. 4,183,612, 4,124,017, 8,689,784, and International Application No. PCT/US2016/021753, which are all incorporated by reference in their entirety. The method of collecting solar radiation described in this disclosure is not limited with respect to the method of producing the collimated beam of solar radiation.

In one embodiment, the thermal storage chamber 205, 609 formed by the thermal storage medium 205, 609, can be stored underground or partially underground to take advantage of the insulating qualities of the surrounding earth. The ease of projecting and redirecting electromagnetic radiation with lenses and mirrors makes this application particularly feasible for residential use.

The heat captured in the thermal storage medium can be extracted for use by passing pipes or finned tubes 402, 407 containing a working fluid such as water or organic fluids such as R245fa through it. It may thus act as a boiler or evaporator FIG. 4, 609. For further insulation of the thermal storage chamber, the entire apparatus may be encased in a refractory material 405, 607 and/or surrounded by a partial vacuum 404. One possible embodiment using a refractory casing 405 and a evaporator/boiler setup is shown in FIG. 4. A more comprehensive illustration of solar absorption device used in an organic Rankine cycle is illustrated in FIG. 6.

In another embodiment, the chamber holding the solar salt or other thermal storage medium 205, 609 in contact with the heating element 202, 403 may be surrounded by another chamber or chambers 701, 702, 703 holding phase change materials with lower melting points than the interior chamber (FIG. 7). These secondary chambers 702, 703 may also be filled with packed clay or other substances with low reactivity and high sensible heat capacity. In one embodiment shown in FIG. 7, several adjacent secondary chambers 702, 703 are arrayed around the central heat collection point and separated by a thermally conductive material such as metal, and contain phase change materials with progressively lower melting points the further they are from the central heat collection point 701, so as to maximize the thermal storage chamber's energy storage capabilities (FIG. 7 shows one example with three chambers, though the concept could be extended to greater than 3 chambers).

Corrosion and heat resistant pipes or finned tubes 402, 407 made of a material such as stainless steel, extruded ceramic, or thermally conductive plastics pass through the thermal storage medium 205, 609, and the working fluid passes through the pipes and absorbs the surrounding heat (FIG. 4 and FIG. 6). A pipe or pipes or finned tubes 402, 407 of a small diameter can be used to ensure rapid heat transfer from the thermal storage medium to the working fluid. In one embodiment, the heating pipes could coil around the tip of the ceramic heating element's exterior surface 403. The working fluid can be pumped into the pipes 605, or, in one embodiment, can be fed through a simple gravity feed. In various embodiments, a one-way valve mechanism 606 such as a Tesla valvular conduit (U.S. Pat. No. 1,329,559) or check valve 606 can be placed at the inlet to the thermal storage chamber to ensure the heat transfer fluid flows only towards the outlet. In various embodiments, a tank 610 that stores the working fluid which passes into the heat cell/evaporator 609 or another heat storage or coolant material can be placed in close proximity to the heat cell itself to allow any heat lost from the cell to be partially recaptured in the fluid of the tank (FIG. 6). A condenser 611 could also be used before feeding the working fluid back into the tank feeding the pump or gravity feed after it is used by a turbine or engine 613 or heat exchanger 612, allowing the whole assembly to act as a closed-loop Rankine cycle (FIG. 6).

UTILITY

The solar collector presented in this disclosure could be ideal for residential applications due to the possible compactness of the resulting thermal storage chamber and the ability to use it in conjunction with solar focusers that do not have reflective surfaces, thus eliminating the physical risk to passersby and birds. The thermal storage chamber could be used as a boiler or evaporator as described above to power home steam turbines or steam engine based generators, or organic Rankine cycles, for example those using scroll compressors run in reverse as expanders, or gerotor motors, or to provide hot water and steam heat or other heated fluids.

The thermal storage chamber could also be used to heat cooking stones for use as cook surfaces, or to heat ovens. One possible configuration of the heating element described in this disclosure could have it embedded in a ceramic cell that would itself act as a cooking surface, as shown in FIG. 5. The high specific heat of ceramic materials and of the thermal storage medium allow for the possibility that the cell could be used as a cook surface for long periods after the cell has been removed from the source of solar radiation.

Another useful application of the thermal storage chamber produced by the heating element described in this disclosure is to generate steam or other hot gases for powering vortex tubes, which separate pressured gas into hot and cold streams, which may be used for low-scale electricity generation using Peltier generators operating on the Seebeck effect (e.g., as in U.S. Pat. No. 8,134,066). For example, the cold 805 and hot 803 ends of vortex tubes could be oriented towards the cold and hot ends of Peltier thermoelectric generator elements 804, in a looped series (FIG. 8). Such a power generation method, though fairly inefficient with current thermoelectric materials, would be very low cost and present no moving parts to maintain.

The foregoing examples or preferred embodiments are provided for illustration purpose and are not intended to limit the present invention. All patent or non-patent references are incorporated by reference in their entirety.

What is claimed is:

1. A solar power collecting system, comprising:
    a Frenel lens having a focal point positioned near a top portion of a tube with a reflective interior surface, wherein the top portion of the tube has a tapered portion which tapers to an opening into which solar radiation is focused, wherein the tapered portion is bent such that it resembles a trumpet bell aimed into the rest of the tube;
    a thermal storage medium contained within a thermal storage capsule; and
    a ceramic solar heating element, forming a cap of the thermal storage capsule, the ceramic heating element comprising:
        a top surface exterior to the thermal storage capsule and forming a generally conical or concave depression having a solar radiation absorption surface; and
        a bottom surface interior to the thermal storage capsule and forming a generally conical protrusion on the bottom surface,
    wherein, when the solar radiation is directed at the depression, the ceramic solar heating element collects heat energy from the solar radiation striking the solar radiation absorption surface, and wherein said solar heating element transfers heat energy to the thermal storage medium through the protrusion on the bottom surface which extends into the thermal storage medium and which is in direct contact with or very near to the thermal storage medium.

2. The solar power collecting system of claim 1, wherein the solar heating element is composed of vitrified porcelain.

3. The solar power collecting system of claim 1, where the solar radiation absorption surface is coated by a layer of oxide-rich glaze in order to enhance absorption of the solar radiation, and to act as a heat sealant.

4. The solar power collecting system of claim 1, wherein the bottom surface of the solar heating element is textured with a honeycomb pattern.

5. The solar power collecting system of claim 1, wherein the bottom surface of the solar heating element is embedded with nichrome wires that protrude into the thermal storage medium, to increase thermal transfer.

6. The solar power collecting system of claim 1, wherein the thermal storage medium is separated into a plurality of chambers arrayed around the central solar heating element, wherein each interior chamber is surrounded by a thermally conductive material, and wherein each chamber holds a phase change material as the thermal storage medium.

7. The solar power collecting system of claim 6, wherein the phase change material in each successive chamber of the thermal storage medium has a higher melting point than in the chamber exterior to it.

8. The solar power collecting system of claim 1, wherein the Fresnel lens is used in conjunction with a converging or diverging lens to form a beam of solar radiation as a collimated or otherwise concentrated beam.

9. The solar power collecting system of claim 1, wherein the thermal storage medium is a 60-40 mixture of sodium nitrate and potassium nitrate.

10. The solar power collecting system of claim 1, wherein the thermal storage medium is sodium chloride.

11. The solar power collecting system of claim 1, wherein the thermal storage medium is used as an evaporator for a Rankine cycle.

\* \* \* \* \*